Jan. 12, 1932. K. WALKER 1,840,861
METHOD AND APPARATUS FOR STEREOSCOPIC CINEMATOGRAPHY
Filed Feb. 29, 1928 4 Sheets-Sheet 1
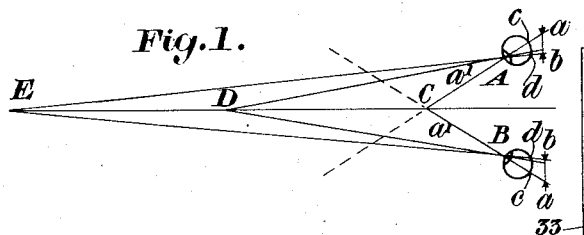
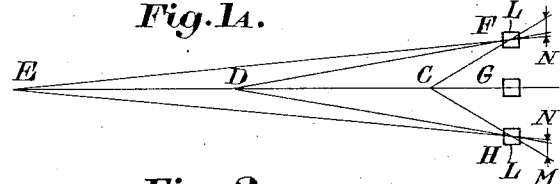
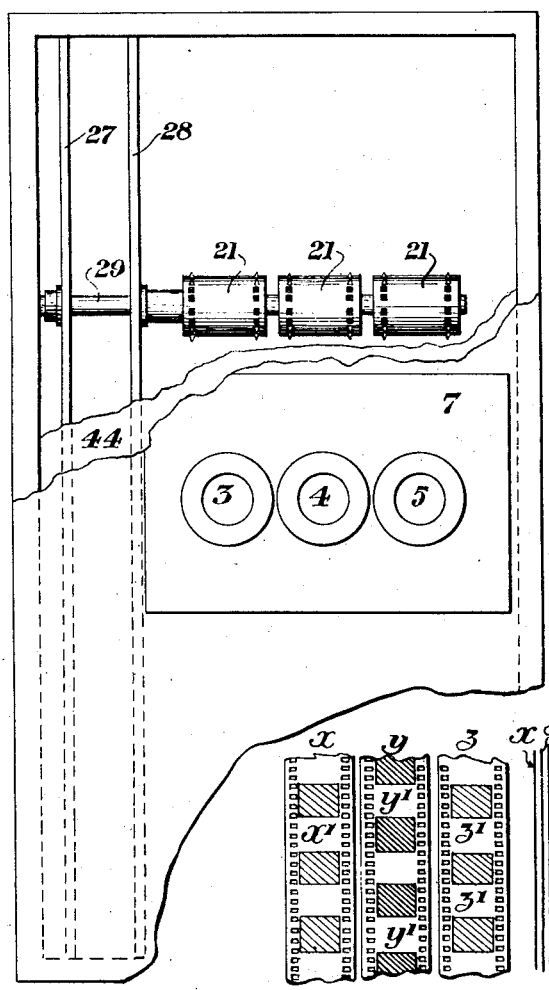
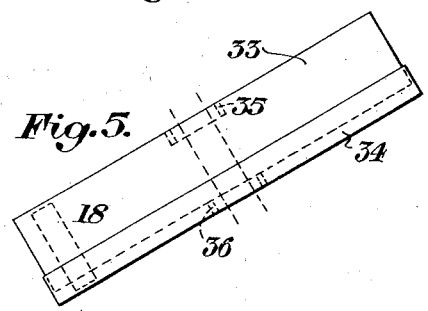
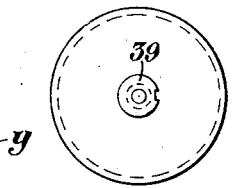
Inventor:
KENNEDY WALKER.
by his Attorney:

Jan. 12, 1932.　　　　K. WALKER　　　　1,840,861
METHOD AND APPARATUS FOR STEREOSCOPIC CINEMATOGRAPHY
Filed Feb. 29, 1928　　　4 Sheets-Sheet 2

Inventor:
KENNEDY WALKER.
by his Attorney;
Percy Haddan

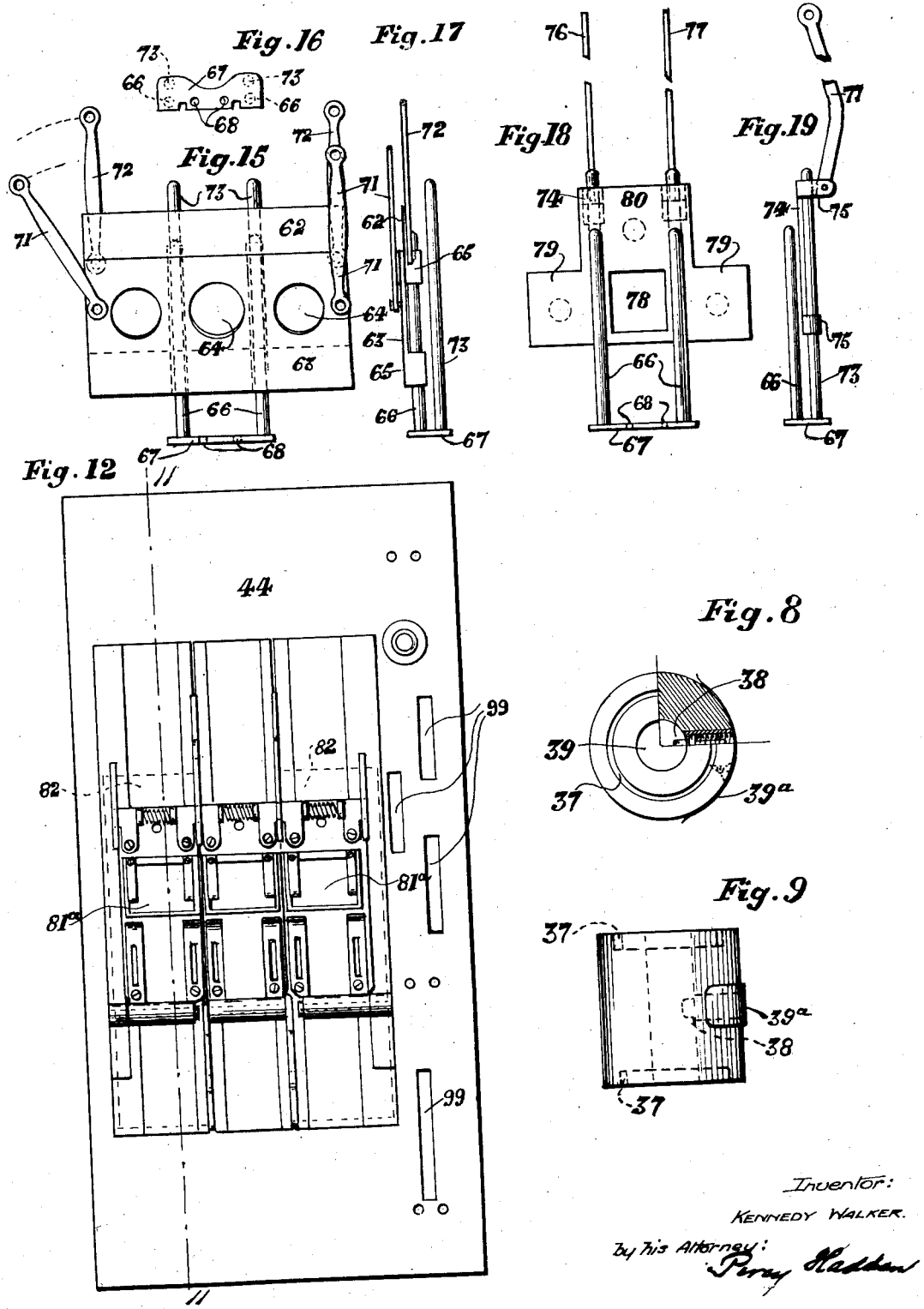

Jan. 12, 1932.                K. WALKER                1,840,861
              METHOD AND APPARATUS FOR STEREOSCOPIC CINEMATOGRAPHY
                     Filed Feb. 29, 1928        4 Sheets-Sheet 4
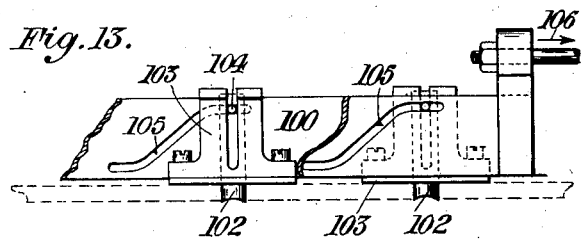
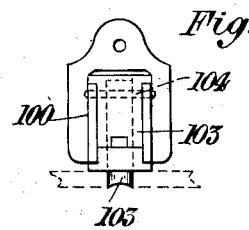
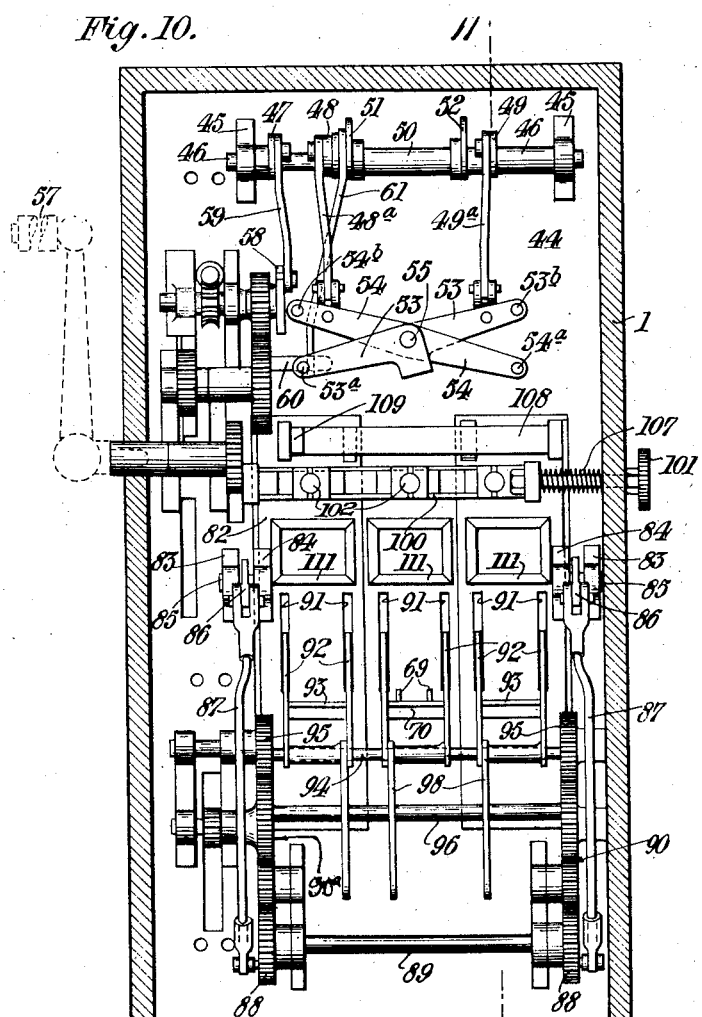
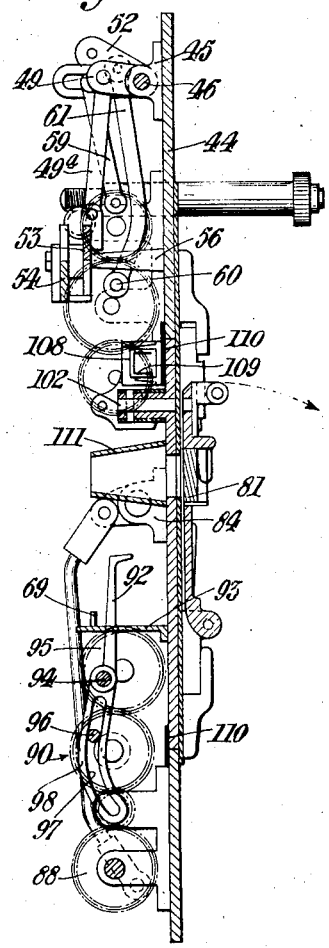
Inventor:
KENNEDY WALKER.
by his Attorney Percy Holden Patented Jan. 12, 1932

1,840,861

UNITED STATES PATENT OFFICE

KENNEDY WALKER, OF LONDON, ENGLAND

METHOD AND APPARATUS FOR STEREOSCOPIC CINEMATOGRAPHY

Application filed February 29, 1928, Serial No. 258,051, and in Great Britain March 4, 1927.

This invention relates to improvements in stereoscopic cinematography and comprises a new method based on a considered principle, for taking and making a film which when projected on to a screen by an ordinary projection apparatus will give a stereoscopic picture of moving objects that is to say in apparent relief.

My invention also comprises an apparatus for photographing subjects in accordance with my improved method.

In order to explain the principle on which my invention is based I will first refer briefly to what constitutes stereoscopic vision.

The reflections from objects "seen" are projected through the lenses (pupils) of the human eyes onto the back of the eyes (the retinas) and this carries to the brain those impressions of light shade and colour which we call a picture.

To see "stereoscopically" it is of course necessary that both eyes should be employed at the same time and on the same objects. The eyes being set apart take impressions from different angles and it is generally assumed that the whole of these impressions are clearly defined in all parts as any good photograph is clearly defined in all parts, this however is not so for the following reasons.

The eyes looking from different angles gather two slightly different impressions or pictures which it will be obvious cannot be superimposed except at one point or distance from the observer, therefore, the rays from any object in front of or behind the particular distance or object on which the eyes are focussed must be more or less crossed from the point of concentration. The amount of displacement of the remaining objects being relative to the angles obtained by different distances of object whether they be nearer or further than the object on which the eyes are focussed.

The particular object fixed upon is placed unconsciously on a more sensitive spot in the back of the eyes which carried definition to the brain whilst the remainder of the eyes carry the crossed portions of the rays in an indistinct manner, which in its turn gives us what is known as stereoscopic relief.

The above is intended to demonstrate that while the particular object chosen by the eyes for examination is clearly defined all other objects in the picture must be more or less crossed.

One object of my invention is to combine these two opposites and produce a picture which when projected on the screen that shall be sufficiently distinct all over and at the same time show these crosses or angles in their proper proportion so as to give said picture stereoscopic relief.

Another object is to obtain this picture on the standard size of cinematographic film (1⅜" wide).

The third object is to produce the picture on one film strip so that it can be run through any cinematograph projector taking usual size film and projected onto an ordinary screen without the use of local appliance of any kind.

In the annexed drawings

Figs. 1 and 1A are diagrams illustrating the principle on which my invention is based.

Figs. 1B to 19 illustrate an example of construction of a camera suitable for taking stereoscopic cinematograph views in accordance with my principle and of which, Fig. 1B is a side elevation of the camera with its side door removed.

Fig. 2 is a front elevation of same.

Fig. 3 is a detail view in elevation of the three lenses of the camera drawn to an enlarged scale.

Fig. 4 is a perspective view of one of the spool boxes part of which is shown cut away.

Fig. 5 is a plan view of Fig. 4.

Figs. 6 and 7 are respectively a plan view and an elevation of a triple shaft on which the film spools are mounted.

Fig. 8 is an elevation and Fig. 9 a plan of a spool.

Fig. 10 is a front elevation of a partition plate carrying parts of the actuating mechanism.

Fig. 11 is a section on line 11—11 of Figs. 10 and 12.

Fig. 12 is a rear elevation of the plate shown in Figs. 10 and 11.

Figs. 13 and 14 are respectively an elevation and end view of a detail of the mechanism and drawn to an enlarged scale.

Figs. 15, 16 and 17 are respectively a front elevation, plan view and elevation of a double shutter and its support.

Figs. 18 and 19 are respectively a front elevation and side view of a single shutter.

Figure 3:
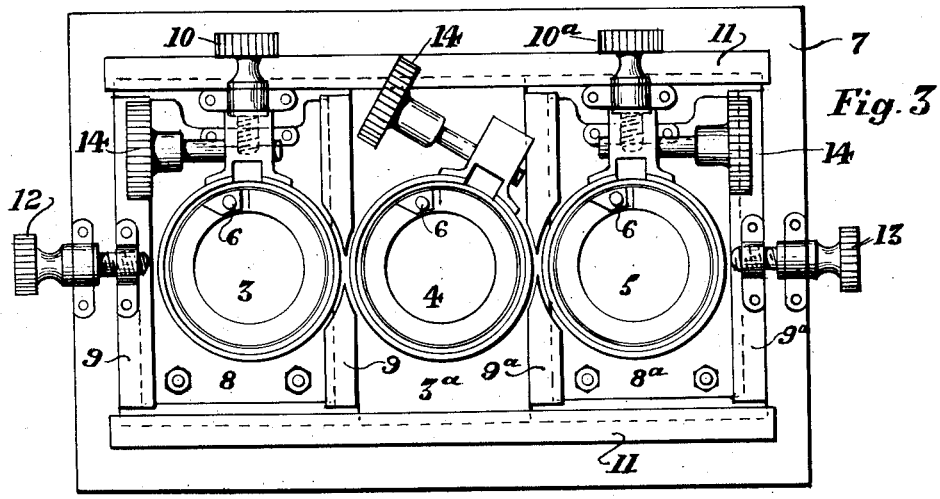

Fig. 20 diagrammatically illustrates portions of the exposed and developed negative film strips and Fig. 21 is a diagram illustrating the order of the negative strips when superposed for the purpose of printing a single positive strip therefrom.

To describe clearly what is meant by the angles of vision previously referred to I will refer to the diagram Fig. 1 which shows the eyes at A and B with exaggerated ray-angles projected through them from the objects at C, D and E equal to distance of say 10 feet, 250 feet and 500 feet from the observer.

Now if the eyes were examining the object at C then the line $a$—$a'$, $a'$—$a$ would represent the angle of vision then the rays from objects at distances of 250 feet and 500 feet cross this angle of vision. $C^1$ indicates the sensitive spots of the eye. Further if the eyes be altered to examine an object at 500 ft. distance, that is to say at the point E, it is clear that the sensitive spots $C^1$ of the eyes must be brought to the positions $d$ in which case the rays from the objects at 250 feet and 10 feet will be crossed by angle of vision on the point E.

Now as it is necessary that a picture projected onto the cinema screen must have good definition at all points of depth it follows that some modification of the eye principle be applied before stereoscopic relief can be obtained combined with good definition; to explain how I effect this I will refer to diagram Fig. 1A.

In this diagram 1A I show three rectangles representing three photographic lenses F G H and it shows again the points or objects at C D and E and as before the rays from these objects projected through the lenses F and H which take place of the eyes A and B in Fig. 1.

These rays cross as they pass through the lenses forming corresponding angles behind them. Thus the whole depth or angles of vision of objects between 10 feet and 500 feet are contained between the angle M L N behind the lenses. If then M N represents the angle it also represents the whole of the angles of vision through this distance and if a film is moved in the direction of the line from M to N while being exposed the whole of the objects along the centre line between 10 feet and 500 feet from the lenses would be partly depicted, that is to say all angles of vision within these distances would be photographed.

This I do by moving the films behind the lenses F and H towards (or from) each other during each exposure.

The two negatives thus secured when superimposed would give a shadowy or indefinite positive.

Now to build up this positive and give a definite form to the subject, I employ a third lens G between the two lenses F and H. Lens G and its film remains horizontally stationary and produces a negative in all respects like the usual cinema camera.

I may expose these negatives in one or other of two ways or in any degrees of modification between them thus;

I may first expose the two outside films behind lenses F and H blanking out the film behind lens G next time exposing G and blanking out F and H and so on alternately. In printing the positive from this method the films from F and H would be superimposed on the blanked out portion of the film from G, so that when projected F and H would be shown on the screen together, then G by itself and so on alternately, the two pictures combining on the screen by the rapidity of succession.

In the second method I expose all three negatives simultaneously, the resulting positive giving both the definite and shadow pictures together and in continuous sequence. The exposure of the two outside films is such as to obtain weak or shadow pictures in these films in comparison with the pictures on the central film which should be clear and sharp. This can be effected by giving the outside films less exposure than the central film for instance half, this being effected in a manner that will be hereinafter described. A similar result could be obtained by exposing all three films for similar periods while fully developing the central film and only thinly developing the two outside films.

I will now describe a suitable apparatus for photographing a subject in my improved method of stereoscopic cinematography with reference to Figs. 1B to 19 of the drawings.

The apparatus or camera consists of a box-like structure 1 of convenient size provided with removable side doors.

Figure 1B:
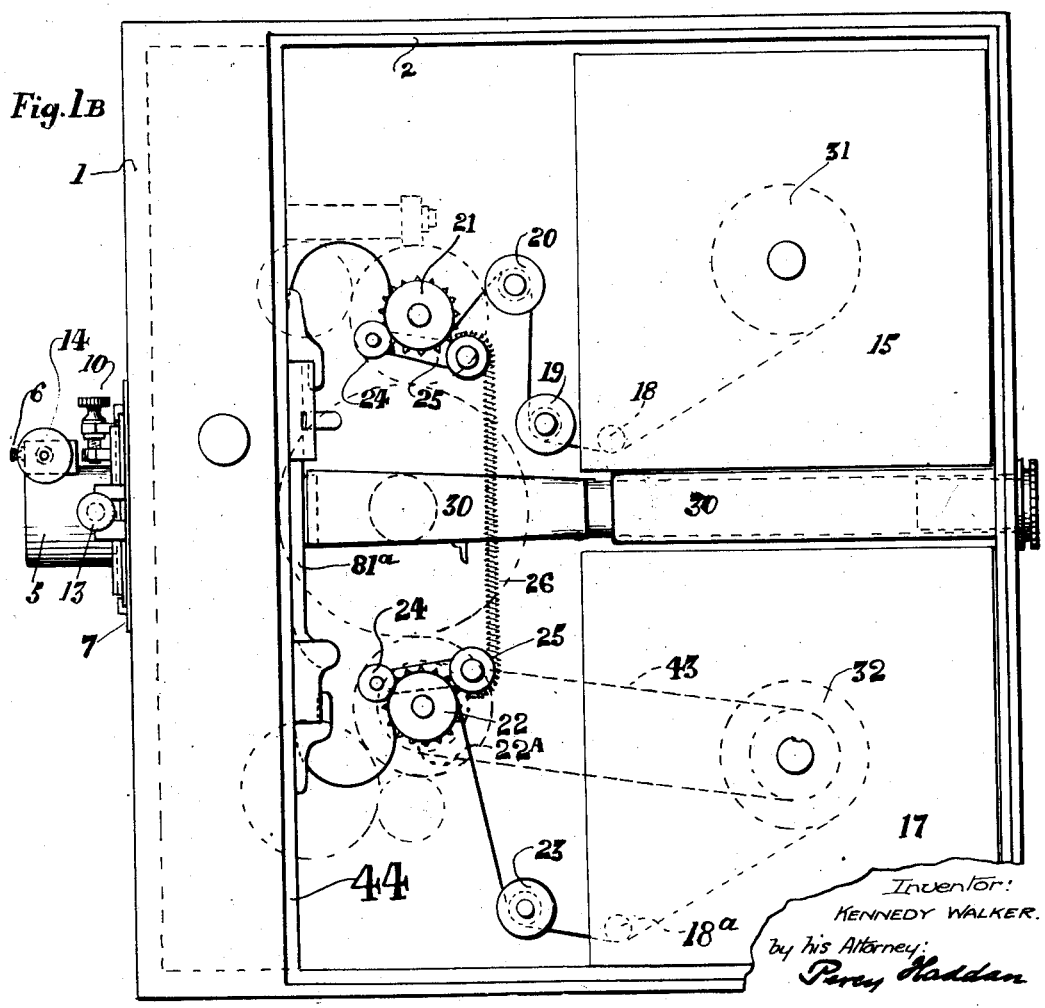

In Fig. 1B the one side door which fits into the recess 2 is shown removed to show the general arrangement of the mechanism for driving the three films during the exposure thereof.

The camera is provided with three lenses 3, 4 and 5 each provided with the usual diaphragm adjusting button or the like 6 and focusing screws 14. These three lenses which are all of the same focal length are mounted on a lens plate 7 attached to the front of the camera, the outer lenses 3 and 5 being adjustable with respect to the centre one 4 which is fixed.

The lenses 3 and 5 are mounted on plates 8 and 8a adjustable vertically in guides 9—9 and 9a—9a by means of adjusting screws 10, 10a the said plates 8, 8a and their guides being also adjustable horizontally by means of adjusting screws 12 and 13 in guides 11 fixed to the plate 7. Each lens is provided with clamping bolts for securing the lens plates 8 and 8a and thus the lenses 3 and 5 are fixed in the adjusted position.

The object for providing this adjustment is to get correct register of one film strip with the other and once effected does not require to be altered for the distances involved. According to the diagram Fig. 1A if for instance the distances were between say 10 to 20 feet it would be necessary to readjust the lenses to get the best results.

By means of the three lenses 3, 4 and 5 three images of the subject are photographed on to the three film strips which are fed through the camera as in the usual manner in cinematographic cameras that is to say they are wound from upper spool boxes 15 (Fig. 1B) through the gates 81 and into lower spool boxes 17 each film strip passing out of its upper spool box over guide rollers 18, 19, 20 and driven by sprocket rollers 21 and 22 and the forks 92 (Fig. 10) through its gate 81 and then passing over guide rollers 23 and 18a into its lower spool-box 17 the sprocket wheels being driven by the usual operating handle through the usual type of main driving gear indicated by the dotted circles in Fig. 1B. 24 are the usual rollers operating to press the strips onto the sprocket rollers 21 these rollers being mounted on pivoted arms 25 and pressed against the sprocket wheels by the tensioned springs 26.

It must be understood that there are three film strips and three gates one for each lens each strip being provided with it spool boxes, driving sprocket rollers and guide roller mechanism as described for passing it through its individual gate—all these trains of mechanism are however simultaneously and synchronously driven by one set of main driving gears which is housed in the space shown in Fig. 2 between partition walls 27 and 28 and drives the shafts 29 and thereby the sprocket rollers 21 and 22. 30 indicates the usual focusing tubes, 31 the spools from which the strips are wound and 32 the spools onto which the strips are wound after exposure.

Each of the spools is housed in a removable spool box 33 provided with a lid 34 (Figs. 4 and 5) the bottom of the box being provided centrally with a fixed ring 35 and the top with a similar and oppositely disposed ring 36. These rings operate to hold the spool in position and form also bearings for same as I will now explain with reference to Figs. 8-9.

Each end of the spool is provided with an annular groove 37 and when the spool is in position in the box the rings 35 and 36 respectively engage in these grooves. The spool is also provided with a transverse spring pressed bolt 38 as shown in Fig. 8 this bolt when the spool is pushed onto its driving spindle 39 Fig. 6 being pressed back and by then rotating the spool or the spindle the bolt is brought opposite a recess in the spindle and under the action of its spring snaps into said recess whereby the spool is keyed to the spindle. A spring clip 39A is provided for holding the end of the film-strip.

The spools are mounted on a triple take up shaft as illustrated in Fig. 6 and consisting of an inner solid shaft 40 a tubular and shorter shaft 41 mounted thereon, and a third and still shorter tubular shaft 42 mounted on tubular shaft 41. These shafts are each provided with a grooved pulley wheel 40a, 41a and 42a respectively fixed thereon and also with the spool spindles 39 the hollow shaft 42 forming itself one of the spool spindles.

Each of the grooved pulleys carries an elastic spring or other band 43 (shown in dotted lines in Fig. 1B) whereby motion is transmitted to each shaft by friction and the rotation of each spool regulated separately so as to allow of automatically taking up slack in the individual films during exposure as they pass from the gates.

The shutter mechanism, the mechanism for reciprocating the gates of the two outer film-strips and the punching mechanism for simultaneously punch-marking the three film-strips are mounted on the partition wall 44 of the camera of which Fig. 10 is a front view, Fig. 12 a back view and Fig. 11 a section on line 11—11 of Figs. 10 and 12.

Mounted in bearings 45 arranged at the top of the front face of the partition 44 is an oscillating shaft 46 carrying three levers 47, 48, 49. Between levers 48 and 49 is a tubular shaft 50 carrying levers 51 and 52. The levers 48 and 49 are connected by links 48a and 49a to the ends of a pair of transverse levers 53 and 54 pivoted together at 55 and to a pillar 56 the link 48a being connected to the one end of 54 and 49a to the opposite end of 53. The shaft 46 is oscillated by the main gearing through handle 57, crank disk 58 and link 59 and the hollow shaft 50 is oscillated at half the speed of 46 by crank 60 and link 61.

The shaft 46 actuates through its lever and link mechanism the double shutter shown in Figs. 15 to 17 and the shaft 50 operates through its levers the single shutter shown in Figs. 17 to 19.

The double shutter (Fig. 15) comprises two overlapping and vertically movable rigid blinds 62 and 63 each provided with three apertures 64 one for each lens. These blinds are provided with sockets 65 by which they are guided on vertical rods 66 mounted on a foot-plate 67 provided with holes 68 by which it can be fitted on pins 69 of a supporting plate 70 fixed to the partition 44.

The blinds 62 and 63 are each provided with a pair of links 71 and 72 respectively by which they are connected to the ends of the levers 53 and 54 the links 71 being respectively connected to the lever ends 53a and 54a and the links 72 respectively to the lever ends 54b and 53b.

It can be understood that when the shaft 46 is oscillated on turning handle 57 the blinds 62 and 63 are, by the action of the lever and link mechanism, reciprocated vertically whereby the apertures 64 are alternately masked and opened to cover or uncover the three lenses 3, 4 and 5 with which they coincide the exposure of the three films may thus be made simultaneously when using this shutter only.

The plate 67 is also provided with a second pair of guide-rods 73 on which the single shutter 74 is guided by means of the sockets 75 this shutter being connected by links 76 and 77 to the levers 51 and 52 connected to the hollow shaft 50 oscillated at half speed.

The single shutter 74 is constructed so that during its vertical reciprocating movement actuated by means of shaft 50 the central film and the two outer films are exposed alternately, the exposure of the central film being made through the aperture 78 while the two wings 79 are masking the side lenses and on the reverse movement of the shutter the central lens being masked by the part 80 while the side lenses are uncovered owing to the wings 79 having passed by.

It can be understood that as the film strips are run through the camera at uniform speed with this type of shutter when the central film is exposed the outer ones are not, so that transversely on the three exposed films I obtain a sequence comprising a blank—image—blank alternated with image—blank—image. By providing apertures such as 81ª of varying sizes in the shutter I can provide for any relative exposures varying between the maximum and minimum on any of the three films according to the sizes of these apertures, the exposures being simultaneous or alternate.

Similarly by screening or varying the size of the outside apertures 64 of the double screen I can vary the relative exposures of the three films.

The mechanism for imparting the lateral reciprocating movement to the two outside films is as follows:—

The respective gates 81ª are mounted on horizontally movable panels 82 mounted in guides in the partition 44 and are shown in Fig. 10 in their inward positions.

Attached to the partition 44 are two bearing members 83 and attached to the respective panels 82 are two similar bearing members 84 one on each panel. Mounted in each pair of bearings 83—84 is a spindle 85 having a right and left handed thread which engage in similar threads of the bearings and these spindles carry levers 86 connected by link-rods 87 to crank disks 88 connected by a shaft 89 driven by the gears 90—88.

It follows that when the crank disks 88 are rotated the spindles 85 are oscillated and by the action of their screw threads operate to reciprocate the bearing members 84 and thereby the horizontally movable panels 82 to which they are attached, the outer films as they pass through the gates 81ª being given the required reciprocating movement.

91 indicates slots in the panels 82 and partition 44 through which the draw-down forks 92 engage the film strips the forks being provided with guides 93 which maintain them opposite their slots the centre guide being the plate 70 forming a support for the foot plate 67 of the shutter carrier previously referred to.

The three forks are carried on the cross shaft 94 connected eccentrically to the gearwheels 95 and by the rotation of which the forks are given their up and down movement.

The inward and outward movement of the forks is effected by the cross shaft 96 connected eccentrically to the gear-wheels 90—90ᴬ and passing through curved slots 97 in tails 98 of the forks.

99 indicate slots in the partition 44 through which the main film drive gearing indicated in dotted lines in Fig. 1B is connected with the gearing mounted on partition 44.

In order to provide for the simultaneous punching of the three film strips these punchings being to provide indicating marks for the re-registration of the films or to mark position of a new subject on the same films, the latter being common practice for a single film, I arrange a transverse sliding frame 100 actuated by the pull button 101. The three punches 102 are each mounted in fixed members 103 adapted to guide them vertically each punch being provided with a cross pin 104 the ends of which engage in sloping cam slots 105. It follows that when the frame 100 is moved in the direction of the arrow 106 (Fig. 13) by means of button 101 the punches will be depressed and punch the three films simultaneously the frame being returned to its original position by spring 107 on release of button 101.

To ensure stability of movement of the reciprocating panels 82 I provide a transverse guide comprising two channel bars 108 and 109 fitting one within the other and respectively firmly fixed to the said panels. These panels are covered at their intersection with partition 44 by thin metal plates 110 not shown in Fig. 10 but shown in Fig. 11.

111 are light protecting hoods for the apertures of the gates, the gates in themselves being of the usual construction and requiring no individual description.

The method of printing a single positive strip is illustrated in Figs. 20 and 21.

Portions of the three developed negative strips $x$ $y$ $z$ are shown in elevation the hatched portions representing the developed images having between them unexposed and consequently clear portions $x^1$ $y^1$ $z^1$. The central strip $y$ is given more exposure than the side strips so that the central strip comprises strong images and the side strips weak images. The strips are superposed so that the images on $x$ and $z$ coincide with the blank portions $y^1$ of the strip $y$ and the images on $y$ coincide with the blank portions $x^1$ $z^1$ of the strips $x$ and $z$. The strips are superposed in the order $x$ $z$ $y$ as shown in Fig. 2 so that the strong negative strip will contact with the positive strip $w$ on which the printing is effected in the usual manner.

What I claim as my invention and desire to secure by Letters Patent of the United States is:—

1. A method of producing cinematographic film-strips adapted to give by projection a stereoscopic picture, consisting in photographing the subject on three film strips by causing them to travel synchronously in the same plane and parallel to one another behind three lenses of a photographic camera, exposing said strips through said lenses respectively, laterally moving the two outer of said strips with respect to the central one of said strips in the same plane therewith during each exposure of said outer strips and returning said outer strips to their original position with respect to the central strip while they are not being exposed, developing the three strips after exposure, superimposing the negatives so obtained and photographically printing a single positive strip from said superimposed negative strips.

2. In the method claimed in claim 1 the exposure of two outer film strips simultaneously, this simultaneous exposure being effected alternately to the exposure of the central film strip.

3. A method as in claim 1 wherein the amount of each exposure of the central film strip differs from the amount of each exposure of the outer film strips.

4. A method as in claim 1 wherein the amount of each exposure of each outer film is alike, the amount of each of these exposures being less than the amount of each exposure of the central film.

5. A method as in claim 1 wherein the extent of the individual movement of reciprocation of each outer film is approximately equal to the movement of the human eye in accordance with the natural angles of vision substantially as herein described.

6. An apparatus for exposing photographic film strips for producing a stereoscopic cinematographic strip comprising a camera body provided with a central lense and two outer lenses in line, means for adjusting the outer lenses both vertically and horizontally, a gate arranged behind each of said lenses, main gearing and intermediate mechanism arranged within the camera body for causing three film strips to travel synchronously with one another through said gates, means arranged outside said camera body for actuating said main gearing and thereby said intermediate mechanism, means for exposing said films, means for regulating the exposures of the film strips through said lenses, means for imparting lateral movement to the gates behind the outer lenses and thereby to the two outer film strips during each exposure thereof, and means for automatically taking up slack in said film strips when they leave said gates.

7. Apparatus as in claim 6 wherein the outer lenses are mounted on lens plates movable and guided vertically and horizontally with respect to a main plate carrying the central lens and mounted on the camera body the said movements being effected by adjusting screws substantially as described.

8. In apparatus as in claim 6 means for effecting the travel of the three films synchronously through the gates, comprises three removable spool boxes arranged in the upper part of the camera body, three removable spool boxes arranged in the lower part of said camera body means for rotatably mounting a spool in each of said boxes, driving sprocket rollers, guide rollers and tension rollers mounted in the camera body adapted to convey these film strips from spools in the boxes in the upper part of the camera body, through the respective gates to spools in the boxes in the lower part of the camera body, drawn-down forks acting intermittently on the film strips, means for actuating said driving rollers and said forks, through the main gearing mounted in the camera body and a crank handle mounted on the outside of said camera body for actuating said main gearing.

9. Apparatus as in claim 6 wherein the lateral movement is imparted to the gates behind the outer lenses by means arranged within the camera body comprising crank and link mechanism, levers, and spindles having right and left handed screw threads on which said levers are mounted, similarly screw threaded bearings in which the threads of the spindle engage fixed respectively to a fixed plate and to plates carrying the outer gates and adapted to slide in said fixed plate, the said crank mechanism being driven by the main gearing of the apparatus substantially as described.

10. In apparatus as in claim 6 means for exposing the photographic film strips travelling through the respective gates comprising two overlapping vertically movable blinds arranged between the lenses and the gates each of said blinds being provided with three apertures one for each lense and means for reciprocating said blinds actuated by the main gearing substantially as described.

11. In apparatus as in claim 6 means adapted to mask the exposure of the photographic film strips travelling through the centre gate and the two outside gates alternately comprising a single shutter and means for imparting vertical reciprocating movement to said shutter actuated through said main gearing substantially as described.

In witness whereof I have signed this specification.

KENNEDY WALKER.